United States Patent [19]

Vignardet et al.

[11] 4,067,555
[45] Jan. 10, 1978

[54] HEAT-SHAPING APPARATUS

[75] Inventors: Lucien Vignardet, Rosny-sous-Bois; Francis Boulet, Parthenay, both of France

[73] Assignee: L'Air Liquide, Societe Anonyme pour l'Etude et l'Exploitation des Procedes Georges Claude, Paris, France

[21] Appl. No.: 650,881

[22] Filed: Jan. 21, 1976

[30] Foreign Application Priority Data

Jan. 22, 1975 France .................. 75.01882

[51] Int. Cl.² .................................. B23K 7/10
[52] U.S. Cl. ........................ 266/58; 33/21 C; 266/60; 266/72; 219/124.34
[58] Field of Search .............. 51/100 P; 83/565; 90/13.5; 144/134 B, 134 C, 144 R, 144 A; 266/58, 62, 67, 69, 72, 73; 33/21 C, 24 R, 23 H; 219/125 R, 125 PL

[56] References Cited

U.S. PATENT DOCUMENTS

| | | | |
|---|---|---|---|
| 2,364,644 | 12/1944 | Mott et al. | 266/58 |
| 2,419,078 | 4/1947 | Ivy | 33/24 R |
| 2,863,361 | 12/1958 | Daugherty | 266/58 X |
| 3,132,291 | 5/1964 | Neander et al. | 266/60 X |
| 3,301,543 | 1/1967 | Semper | 266/60 |
| 3,541,695 | 11/1970 | Kelsey | 33/24 R |

OTHER PUBLICATIONS

"Large Tank Sidebeam Tracker," Welding Journal, pp. 253 - 1974.

*Primary Examiner*—Roy Lake
*Assistant Examiner*—Paul A. Bell
*Attorney, Agent, or Firm*—Lee C. Robinson, Jr.

[57] ABSTRACT

This invention relates to apparatus for cutting or shaping material, as by heat-shaping, wherein the outline of a predetermined pattern is copied on the material which is to be worked on by following the pattern with a follower member whose movement is used to control a cutting or heat-shaping tool.

A vertically-arranged copying panel to receive the pattern is provided with two horizontal rails and a support which is movable along said rails. The follower member and the tool are mounted on the support and movable in vertical and horizontal directions, respectively, with respect to the support, and the support is movable across the copying panel and material worked on.

4 Claims, 2 Drawing Figures

HEAT-SHAPING APPARATUS

The invention may be embodied in apparatus incorporating a melting or oxidizing cutting machine to produce sequentially and automatically, cut articles of various shapes from sheets of various metals or from particle board, plywood, plastics materials or even from lengths of fabric.

BACKGROUND OF THE INVENTION

The present invention relates to apparatus for cutting or shaping materials such as by heat-shaping, which operates by copying the outline of a pattern onto material which is to be worked on. This apparatus generally includes a member for following the pattern, the pattern follower-member being able to move in two mutually perpendicular directions and at least one heat-shaping tool which is likewise movable in two mutually perpendicular directions. A control device receives information from the follower member to correspondingly drive the follower-member to trace the pattern and to drive the tool to copy the pattern.

The expression "heat-shaping" as used herein is employed to denote the performing of a shaping, cutting etc. operation by the application of heat. As an example, heat-shaping apparatus may be a melting or oxidizing cutting machine which produces sequentially and automatically, cut articles of various shapes from sheets of steel, stainless steel, aluminium, light alloy, etc, from sheets of particle board, plywood, plastics materials, or from lengths of fabric.

The pattern to be copied may be formed by a design drawn on a sheet of ordinary paper or tracing paper, by a dark silhouette on a light background, by a flat steel template attached to a copying table, and the like.

The follower member may be a conventional device, such as an electronic follower with an optical tracker, particularly useful where a drawing or silhouette is traced out, or a magnetic follower or a curve tracer which are advantageous where a template is copied.

The aforementioned heat-shaping tool may be conventional, such as an oxy-acetylene gas cutting torch of the ordinary or flux-injection type, an electrical arc device employing a carbon electrode, a coated or tubular electrode, a consumable electrode (made of mild steel), or a refractory electrode (made of tungsten) which operates under a gaseous shielding atmosphere (the MIG or TIG processes), or a plasma torch, a laser, etc. A plurality of tools may be used in order to allow a plurality of worked parts to be produced simultaneously from a single pattern-following operation.

Presently known apparatus of this type for working on materials by thermal means is provided with a horizontal copying table on which the pattern is mounted, and the follower member is mounted on a framework arranged above the table, the framework and/or the follower member being movable in two mutually perpendicular directions which together define a horizontal plane, so that the entire pattern can be followed. The tool is mounted on an arm or the like which is secured to the framework and is arranged over another horizontal table which supports the material to be worked on. The tool thus performs the same movements as the follower member, that is, the tool is translated in the same directions as the follower member; This type of apparatus has the disadvantage that it requires a large amount of available space. The copying table occupies a large floor space whether the apparatus in use or not, and this occupied floor space, effectively is doubled when the apparatus is operating, owing to the fact that the cutting area in which the tool moves also is on the floor adjacent the table during such operation.

OBJECTS OF THE INVENTION

It is an object of the present invention to overcome or minimise this disadvantage of known apparatus by providing a copying apparatus for heat-shaping materials which is of small size to occupy minimal space when in use and to occupy even less space when out of use.

A further object of this invention is to provide copying apparatus wherein the pattern to be copied and the material to be worked on are in respective planes which are perpendicular to one another.

Another object of this invention is to provide improved copying apparatus which, when not in operation, is foldable to decrease its effective size.

Various other objects, advantages and features of this invention will become apparent from the ensuing detailed description, and the novel features will be particularly pointed out in the appended claims.

SUMMARY OF THE INVENTION

The apparatus according to the invention is provided with a copying surface and a cutting area positioned perpendicular to one another so that the total floor space occupied thereby is considerably reduced in comparison with prior art apparatus.

In accordance with one feature the apparatus has a vertical copying panel or support plane which is provided with two horizontal rails, and a support structure, or frame, which is movable along the rails. A follower member and a tool are mounted on the support structure for movement in vertical and horizontal directions respectively.

With this arrangement the copying surface lies in a vertical plane whereas the cutting area is horizontally disposed. The result is that the floor space occupied during operation does not substantially exceed that taken up by the cutting area proper. In accordance with another feature the support structure is so mounted that it can be folded back against the copying panel when the apparatus is not in use.

The size of the apparatus, when it is not in use, is thus reduced to a minimum.

In accordance with yet another feature of the invention, the support structure is comprised of a carriage fitted with rollers which co-operate with the rails, and a jib or bracket which is formed of a vertical upright on which the follower member is mounted and a horizontal strut on which the tool is mounted, the upright being hinged to the carriage so that it can pivot about a vertical axis.

BRIEF DESCRIPTION OF THE DRAWINGS

The course of the following description will best be understood when taken in conjunction with the accompanying drawings, which are given solely as non-limiting examples, and in which.

DETAILED DESCRIPTION OF A PREFERRED EMBODIMENT

Figure 1:
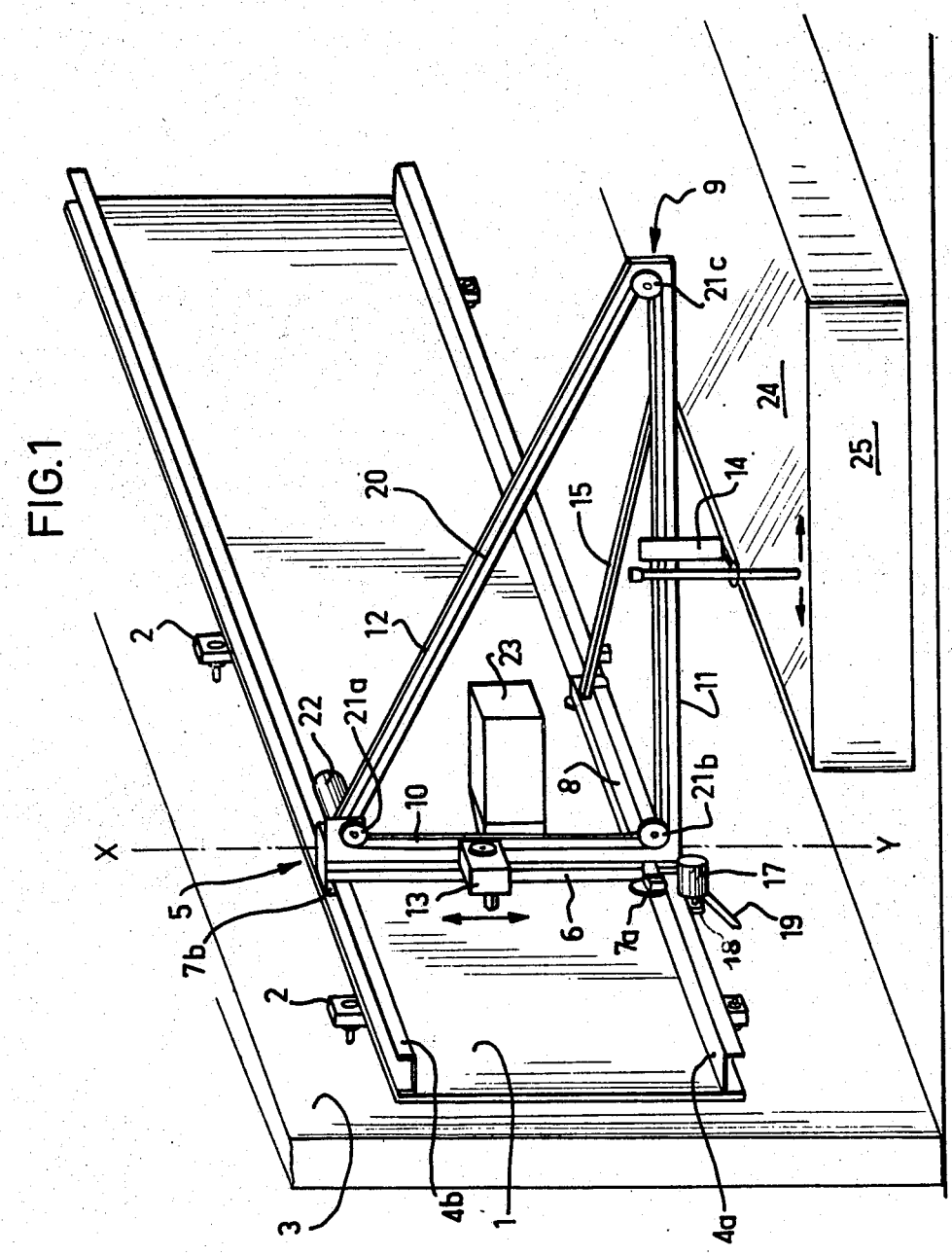
FIG. 1 is a schematic view of an apparatus according to the invention in its operative position.

In the embodiment shown in the drawings the apparatus according to the invention is comprised of a vertical panel 1, which forms a copying table to receive and support a pattern to be copied and which is attached by bars 2 or other suitable members to a wall 3. Along its upper and lower edges respectively, panel 1 is fitted with two parallel horizontal rails 4a and 4b. On vertical panel 1 is mounted a support which is movable in horizontal translation and which is referred to generally by reference numeral 5. Support 5 includes a carriage 6, which is fitted at one end, for example the bottom, with support and guiding rollers 7a which co-operate with the lower rail 4a. At the other end or top, carriage 6 is fitted with guide rollers 7b which co-operate with the upper rail 4b. Carriage 6 is further equipped, at the bottom, with an arm or brace 8 parallel to rail 4a. Support 5 also includes a jib or bracket 9 in the form of a right-angled triangle formed by a vertical upright 10, a horizontal strut 11 and an oblique cross-bar 12. The vertical upright 11 is hinged to carriage 6 so that it is able to pivot through an angle of 90° about a vertical axis XY. A strengthening bar 15, which has a fixed-geometry joint secured at one end to strut 11 and a hinged joint provided at the other end to arm 8 of carriage 6, allows the jib 9 to be held in the open position shown in FIG. 1, i.e. perpendicular to panel 2, when the apparatus is disposed for operation.

A follower member 13 and a tool 14 are mounted to slide on upright 10 and strut 11, respectively, so as to move in two mutually perpendicular directions, the plane formed by these two mutually perpendicular directions being perpendicular to rails 4a and 4b, that is to say to the direction in which support 5 moves with respect to copying panel 1.

The tool 14 may be constituted by any of the devices previously referred to, depending upon the particular cutting and/or shaping requirements and circumstances.

Support 5 is driven to traverse panel 1 by a motor, such as an electric reduction-motor assembly 17 equipped with a pinion or roller 18 which engages a rack or the like (not shown) provided on the lower rail 4a. An uncoupling handle 19 allows support 5 to be moved by hand along rails 4a and 4b by disengaging pinion or roller 18 from the rack which it normally engages.

The follower member 13 and the tool 14 are moved along upright 10 and strut 11, respectively, by a transmission cable 20 to which the follower member and the tool are secured. Cable 20 runs over rollers 21a, 21b, 21c which are provided at the three angles of the triangle formed by the jib, one of these rollers, 21a, being secured to the shaft of a motor, such as an electric reduction-motor assembly 22 which may be mounted on the upper part of upright 10.

A control device 23, which may be mounted on upright 10, receives information from follower member 13 and, acting on this information, drives reduction motor assemblies 17 and 22 in a known manner, whereby follower member 13 traces the pattern on panel 1 and tool 14 correspondingly cuts or shapes the material that is worked on.

The article 24 to be worked on may be a steel sheet for example, or other suitable material, and rests horizontally on a support 25.

In operation, follower member 13 follows the outline of the pattern, such as the drawing or template carried by the vertical panel 1, and the tool 14 copies this traced outline on material 24. This is achieved by driving support 5 as a whole along rails 4a and 4b by reduction motor assembly 17 to obtain the horizontal dimensions of the copied pattern, and by driving the tool 14 along strut 11, as follower member 13 is driven along upright 10 by reason of the interconnection therebetween provided by cable 20 so as to obtain the vertical dimensions of the copied pattern.

In the operating configuration the apparatus occupies a floor space which is essentially only that occupied by the cutting area, i.e. that occupied by the part to be worked on 24.

Figure 2:
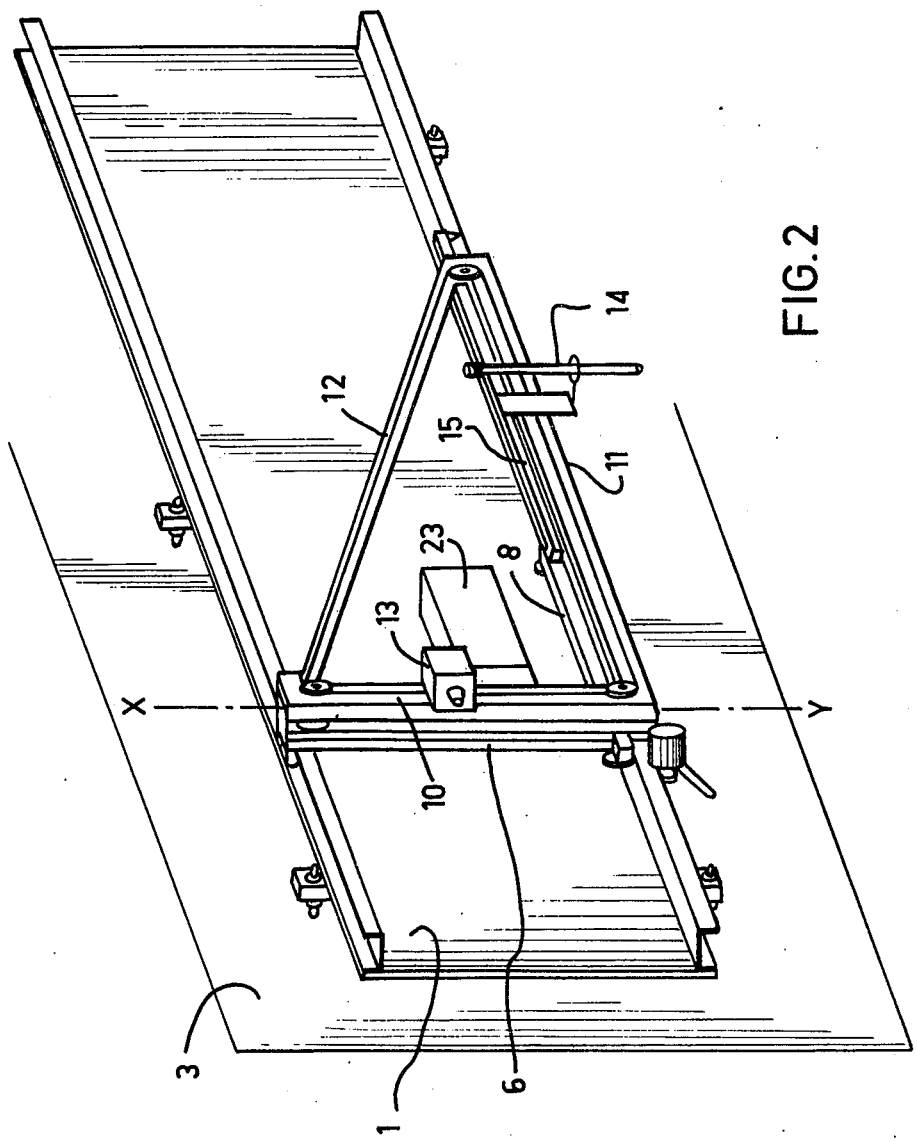
FIG. 2 shows the apparatus in its non-operative position.

When the apparatus is not in use, strengthening bar 15 is disconnected from strut 11 and bracket 9 need merely be folded back against the panel by turning it about axis XY as shown in FIG. 2. The apparatus then occupies a very small floor space.

It is of course comtemplated that many modifications and alterations can be made to the embodiment which is described and shown without thereby departing from the scope of the invention. Thus, a plurality of tools, such as a plurality of cutting torches, can be mounted on strut 11 so that a plurality of articles could be worked on simultaneously. Cable 20 could be replaced by a chain, a metal strip or any other connecting means capable of ensuring that the follower member and the tool perform identical movements. Further, instead of being attached to a wall as shown, panel 1 could be provided with a stand or the like which allows it to rest directly on the ground, or on a floor, bed, or other support, which stand could carry two symmetrically arranged panels.

We claim:

1. Apparatus for heat-shaping by copying the outline of a pattern onto material which is to be worked on, comprising a follower member movable in two mutually perpendicular directions for following said pattern, at least one heat-shaping tool movable in two mutually perpendicular directions, means for driving said follower member and said tool in their respective directions of movement, control means for receiving information from said follower member to actuate said driving means in accordance with said information, a copying panel disposed in one plane to receive said pattern, said panel being provided with two parallel rails, and support means movable along said rails, said follower member and said tool being mounted on said support means for movement in vertical and horizontal direction, respectively, said support means being foldable back against said copying panel.

2. Apparatus for heat-shaping by copying the outline of a pattern onto material which is to be worked on, comprising a member movable in two mutually perpendicular directions for following said pattern, at least one heat-shaping tool movable in two mutually perpendicular directions, means for driving said follower member and said tool in their respective directions of movement, control means for receiving information from said follower member to actuate said driving means in accordance with said information, a copying panel disposed in one plane to receive said pattern, said panel being provided with two parallel rails, and support means movable along said rails, said follower member and said tool being mounted on said support means for movement in vertical and horizontal direction, respectively, and wherein said support means includes a carriage fitted with guiding and movement rollers which cooperate with the said rails, and a bracket which is provided with a vertical upright on which said follower member is mounted and with a horizontal strut on which said tool is mounted, said upright being connected to said carriage to pivot about a vertical axis.

3. Apparatus according to claim 2, which includes a first electric reduction-motor assembly secured to said carriage to drive the latter in translation along said rails.

4. Apparatus according to claim 3, which further includes a second electric reduction-motor assembly secured to said bracket which is provided to operate a transmission means to which said follower member and said tool are connected.

* * * * *